United States Patent

Beck

[15] 3,636,763
[45] Jan. 25, 1972

[54] MEASUREMENT OF THE FLOW OF PARTICULATE MATERIAL

[72] Inventor: Maurice Sidney Beck, Bradford, England

[73] Assignee: National Research Development Corporation, London, England

[22] Filed: May 14, 1969

[21] Appl. No.: 824,612

[30] Foreign Application Priority Data

May 17, 1968 Great Britain......................23,585/68

[52] U.S. Cl..........................73/194 E, 324/61 R, 324/71 R
[51] Int. Cl............................................................G01f 1/00
[58] Field of Search ......................73/194, 28, 61; 324/61, 71

[56] References Cited

UNITED STATES PATENTS

| 2,047,529 | 7/1936 | Turk | 73/194 A |
|---|---|---|---|
| 3,176,513 | 4/1965 | Kriete | 73/194 R |
| 2,491,445 | 12/1949 | Cunningham et al. | 73/194 |
| 2,779,917 | 1/1957 | De Boisblanc | 324/40 |
| 2,820,945 | 1/1958 | Marsden, Jr. | 324/33 |
| 2,825,872 | 3/1958 | Stubbs et al. | 324/71 |
| 3,184,967 | 5/1965 | Rogers | 73/194 |
| 3,218,852 | 11/1965 | Scarpa et al. | 73/194 |
| 3,359,796 | 12/1967 | Dimick | 73/194 |

Primary Examiner—Charles A. Ruehl
Attorney—Cushman, Darby & Cushman

[57] ABSTRACT

A method of measuring the flow rate of particulate material in pneumatic conveyors in which random perturbations in the material flowing through the conveyor are sensed and utilized to generate a noise signal the power of which is a measure of the flow rate of the particulate material.

9 Claims, 4 Drawing Figures

MEASUREMENT OF THE FLOW OF PARTICULATE MATERIAL

The invention relates to the measurement of the flow of particulate materials conveyed hydrodynamically by means of a flowing fluid and more particularly, but not exclusively, to the measurement of the flow of powdered materials.

When powdered solids are transported by means of pneumatic conveyors the air to solids ratio is usually high, for example it may be about 500:1 and, therefore, the particles of the powder are free to move independently of one another. This results in a random perturbation due to turbulence naturally occurring in the conveying air being superimposed upon the general motion of the particles along the conveyor. This random perturbation of the general motion of the particles is known as flow noise.

It has been proposed to measure the rates of flow of powdered solids in pneumatic conveyors by measuring the passage of flow noise disturbances between two positions in the conveyor that are separated by a known distance. However, as the flow noise is continually changing it is necessary to use sophisticated mathematical techniques to enable a disturbance arriving at the second position to be recognized as a disturbance which has passed the first position some time previously. These techniques require the use of an "on-line" computer, which may not be readily available.

In this context, the invention makes use of the face that in use the air velocity and the overall pressure drop along the pneumatic conveyor are both substantially constant over wide ranges of solids flow rates. Furthermore, the solids to air velocity ratio is also substantially constant over a wide range of solids loading of the conveyor. Therefore, as the velocity of the solids flowing in the conveyor can be treated as substantially constant, in order to determine the powder mass flow rate it is only necessary to measure the instantaneous loading per unit length of the conveyor. The invention achieves this by sensing the flow noise within the conveyor, the intensity of which is related to the solids loading of the conveyor.

It is to be understood that similar considerations will apply if fluids other than air are used as the conveyor medium, and the particulate material may be a liquid in droplet form.

According to one aspect of the present invention there is provided a method for measuring the flow rate of particulate material conveyed hydrodynamically by means of a flowing fluid, comprising the steps of producing a noise signal related to the flow noise of the particulate material, and determining the power of the noise signal.

According to another aspect of the invention, there is provided apparatus for measuring the flow rate of particulate material conveyed hydrodynamically by means of a flowing fluid, comprising sensing means adapted to be associated with a conveyor through which the fluid is to flow so as to be capable of sensing flow noise of particulate material flowing through the conveyor, means for producing a noise signal related to the flow noise, and means for determining the power of the noise signal.

The flow noise will cause random changes in the effective dielectric constant of the material flowing through the conveyor. Preferably the flow noise is sensed by detecting random changes of the capacitance of an electrode inserted in the conveyor due to these random changes in the effective dielectric constant of the material. Preferably the means for sensing the flow noise comprises an electrode consisting of a first portion of the wall of the conveyor which is insulated from a second portion of the wall of the conveyor so as to form a capacitor. The changes in the effective dielectric constant of the material flowing through the conveyor will cause corresponding changes in the capacitance of the electrode thus, by means of a capacitance transducer, causing a signal to be generated which is related to the flow noise and hence to the material flow rate.

Preferably the apparatus includes means for compensating for changes in the actual dielectric constant of the particulate material.

Where the flow noise is sensed by detecting random changes of the capacitance of an electrode, the relationship between the material flow rate and the signal generated by the apparatus is found as follows:

The number of particles of material Q which are within the field of the electrode at any given time is proportional to the loading $\omega$ of the conveyor. As has already been stated the particles are free to move independently of one another with the result that a large number of small changes of the capacitance of the electrode is caused by individual particles crossing the field of the electrode. These perturbations have a Gaussian distribution because the particle behavior obeys the central limit theorem. Gaussian noise can be approximated by a band limited white noise with a power spectral density which is substantially uniform up to a cutoff frequency $f_c$ which increases in proportion to the number of independent particle vibrations, i.e., $f_c \alpha Q$ or $f_c \alpha \omega$. The total power $\sigma^2$ of the capacitance noise $x(t)$ depends directly upon the number of particles Q and the dielectric constant $\epsilon$ of the powder, that is $\sigma^2 \alpha \epsilon^2 Q^2$ and therefore $\sigma^2 \alpha \epsilon^2 \omega^2$. The total capacitance noise power is also given by $$\sigma^2 = \int_0^\infty \phi_x(f)\,df.$$

The power spectrum of the capacitance noise at the electrode is substantially uniform up to the cutoff frequency $f_c$, therefore if $f < f_c$ $$\sigma^2 = f_c \phi^x(f)$$
$$\sigma^2 = \omega \phi_x(f)$$
$$\text{and } \epsilon^2 \omega = \phi_x(f)$$

The frequency spectrum $\phi_m(f)$ of the output signal $m(t)$ from the capacitance transducer used is $\phi_m(f) = \phi_x(f) |K_1 G_1(jf)|^2$ where $K_1 G_1(jf)$ is the transfer function of the transducer.

The dynamic response of the transducer is arranged to be constant, and it is also arranged that the noise spectrum extends well above the transducer frequency response, therefore $$\int^\infty \phi_m(f)\,df \alpha \phi_x(f)$$

and $$\epsilon^2 \omega \alpha \int_0^\infty \phi_m(f)\,df$$

The above integral is equal to the total power or mean square value (P) of the signal $m(t)$. Squaring the signal $m(t)$ and smoothing the squared value gives $$\overline{m^2(t)} \alpha \int_0^\infty \phi_m(f)\,df$$

where $\overline{m^2(t)}$ is the mean square value of $m(t)$
therefore $\overline{m^2(t)} \alpha \epsilon^2 \omega$
But if the material velocity is constant, M, the mass flow is given by:

$$\epsilon^2 M \alpha \overline{m^2(t)}$$
$$\text{or } M = k a \overline{m_2(t)}/\epsilon^2$$

where $k$ is a constant determined by calibration.

Other parameters that can be used to sense the flow noise within the conveyor are variations in the effective conductivity, or density of the contents of the conveyor.

Thus if $\phi_x^*(f)$ is the value of $\phi_x(f)$ for $f < f_c$, $\sigma^2 = f_c \phi_x^*(f)$ and hence $\epsilon^2 \omega \alpha \phi_x^*(f)$.

The mathematical derivation given above will still be applicable with appropriate changes made to the form of the noise signal applied to the transducer.

The invention will be further described by way of example with reference to the accompanying drawings in which:

FIG. 1 shows a schematic arrangement of an embodiment of $$\int_0^\infty \phi_m(f)\,df\,\alpha\phi_x^*(f)$$

pneumatic conveyor;

Figure 1:
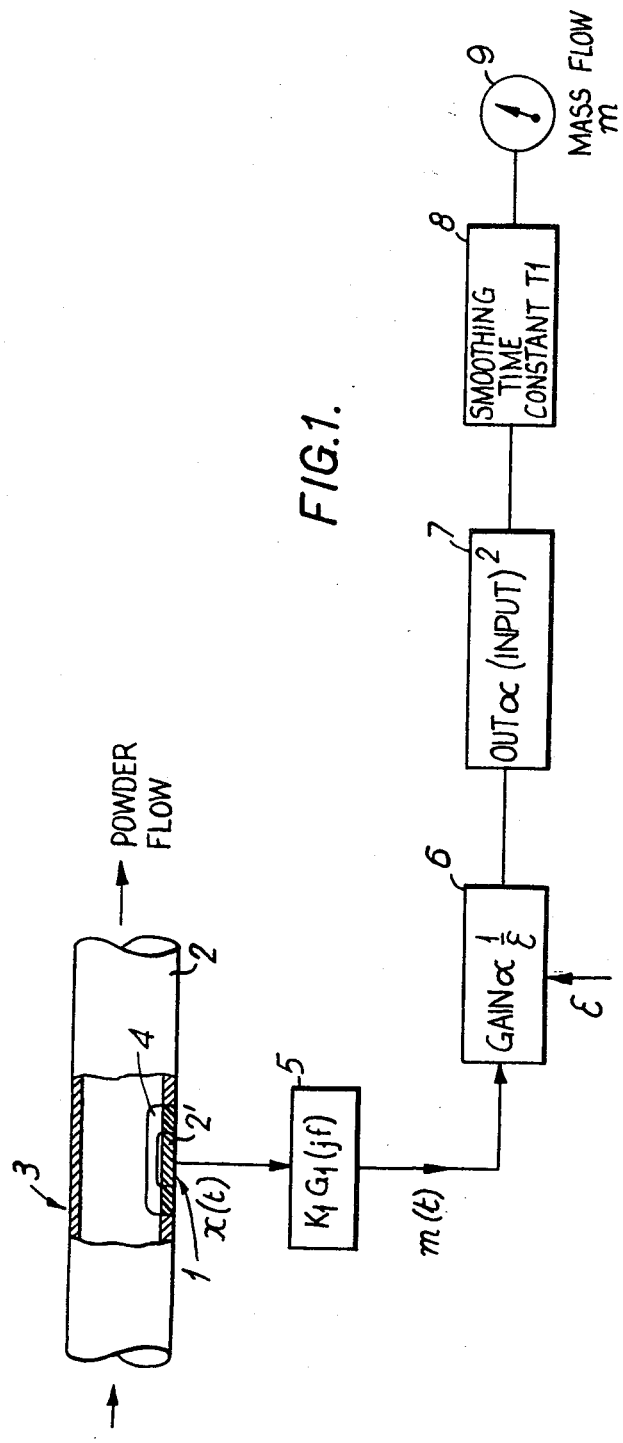

Referring to FIG. 1, an electrode 1 is formed by a section 2' of the wall 2 of a pneumatic conveyor 3 which is separated from the remainder of the wall 2 by means of insulating material 4. It has been found in practice that the sensitivity of the electrode 1 is dependent upon the separation of the section 2' from the remainder of the wall 2, and also upon the length of section 2'. For example, for a conveyor 3 having a diameter nominally of 4 inches it has been found that a suitable length for the section 2' is 6 inches, and that the separation should be in the range of 0.1 to 1.0 inches, 0.5 inches being the most suitable separation. A capacitance transducer 5 to be described more fully later, is connected to the electrode 1. The instantaneous output of the capacitance transducer 5 is compensated for changes in the dielectric constant of powder flowing in the conveyor 3 by means of a compensating circuit 6, also to be described more fully later, to which a signal $\epsilon$ related to the dielectric constant of the powder is applied. The signal $\epsilon$ is derived from another transducer, which is not shown, that is positioned either in the powder feed hopper, also not shown, or the hopper into which the powder is discharged. The output from the compensating circuit 6 is squared and smoothed in circuits 7 and 8 to give a final signal which is related to the mass flow rate M of powder in the conveyor weighted over the time constant $T_1$ of the smoothing circuit 8, this final signal being applied to an indicating instrument 9. Typically $T_1$ is about 0.1 seconds, thus giving a virtually instantaneous indication of the flow. The dielectric constant compensation circuit 6 removes unwanted capacitance changes caused by variation in the dielectric constant of the powder due to the presence of moisture in the powder.

Figure 2:
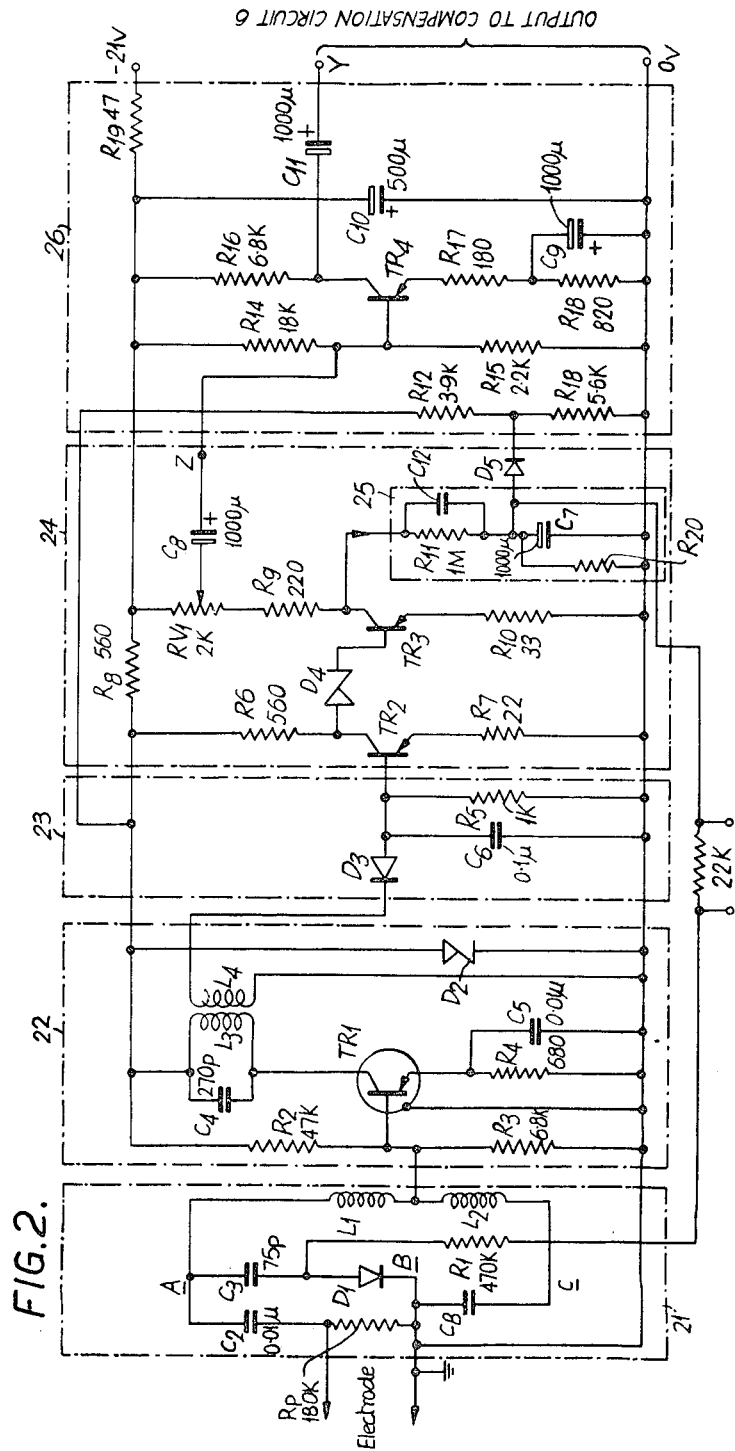
FIG. 2 shows a circuit diagram of a capacitance transducer incorporated in the embodiment of FIG. 1.

Referring to FIG. 2, the capacitance transducer 5 consists of a capacitance bridge circuit 21 which includes a variable capacitance diode $D_1$. The output signal from the circuit 21 is applied to the base of a transistor $TR_1$ that forms part of an oscillator circuit 22. The oscillator 22 is arranged to operate under threshold conditions, and therefore the amplitude of the oscillations is modulated by the capacitance of the electrode 1. A rectifier circuit 23 including a diode $D_3$ is arranged to demodulate the output from the oscillator 22. The modulation envelope (which corresponds to the variations in the capacitance of the electrode 1) is amplified by a DC amplifier 24 including two transistors $TR_2$ and $TR_3$. Overall negative feedback derived from the output of the transistor $TR_3$ is applied via a negative feedback circuit 25 to the variable capacitance diode $D_1$, which therefore acts as a voltage-to-capacitance transducer. An AC amplifier circuit 26 provides the final output signal from the transducer 5.

A particular feature of the transducer 5 when using the component values shown in FIG. 2 is that it has a sensitivity greater than 1,000 volts/pF, which is sufficient to give a substantial output from the flow noise that occurs even with the smallest solids loadings that are used in practice in pneumatic conveyors. In addition, the negative feedback circuit 25 is arranged to give a frequency response that has a very small low-frequency gain so that there is automatic compensation for variation of up to 7 pF in the standing capacitance of the electrode 1. Hence the build up upon the electrode 1 of powder flowing in the conveyor 3 does not effect the operation of the instrument.

Figure 3:
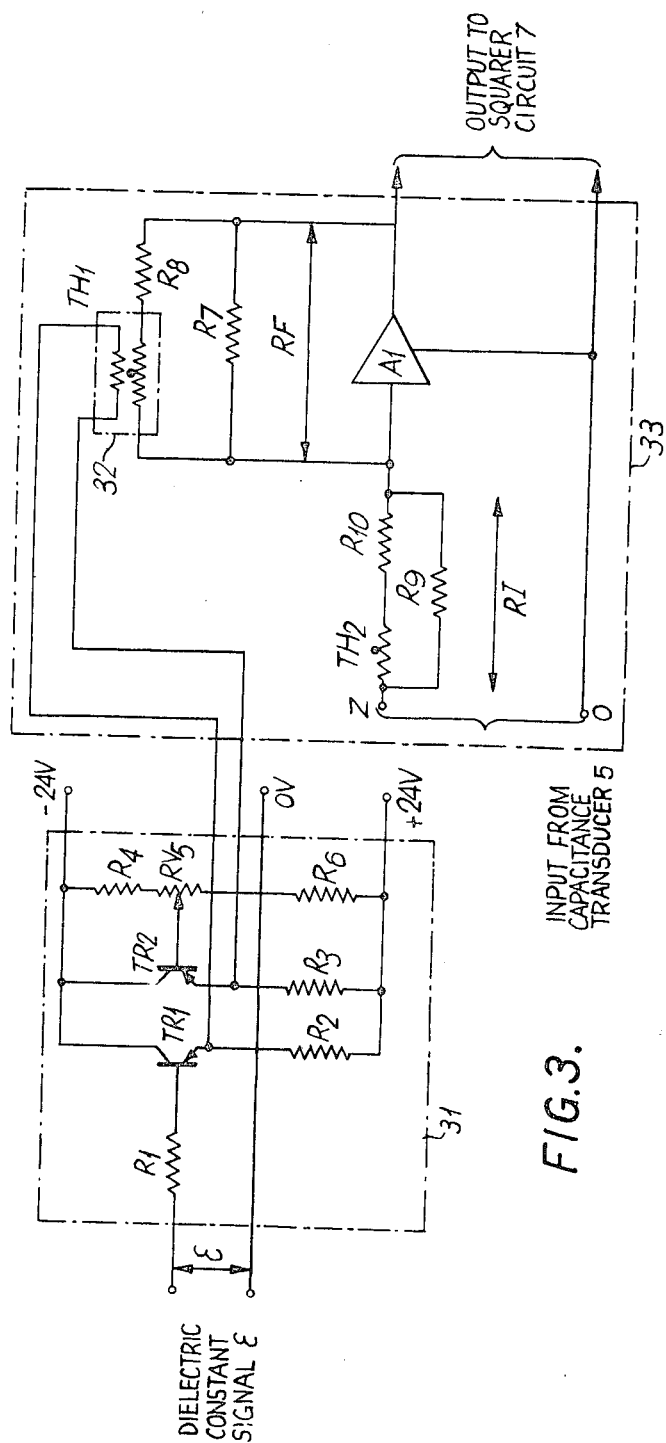
FIG. 3 shows a compensating circuit for changes in the dielectric constant of powder flowing in the conveyor.

Referring to FIG. 3, the dielectric constant compensation circuit has two main components, the first 31, is a power amplifier which drives a heater/thermistor unit 32. The second main component is a unity nominal gain AC amplifier 33 which includes the thermistor $TH_1$ incorporated in the unit 32 in its feedback circuit in order to vary the actual gain. The input voltage to the amplifier 31 is arranged to be proportional to the dielectric constant of the powder flowing in the conveyor 3. This is derived from the transducer, which is not shown, that is positioned either in the feed hopper (also not shown) for the powder or in a hopper into which the powder is discharged. The thermal capacity of the heater/thermistor unit 32 ensures that the amplifier 31 only responds to relatively slow changes in the effective capacitance of the electrode in the hopper, thus smoothing out short term variations in the compensation electrode capacitance. The resistors designated $R_7$ and $R_8$ are such as to ensure that the relationship between the effective feedback resistance $R_f$ of the amplifier 33 and the dielectric constant $\epsilon$ of the powder is approximately linear.

It is apparent that the ambient temperature will effect the resistance of the thermistor $TH_1$. This is compensated for by incorporating into the input path of the amplifier 33, components $TH_2$, $R_9$ and $R_{10}$ that are identical with the components $TH_1$, $R_7$ and $R_8$ so that the effective resistance of the input and feedback circuits of the amplifier 3 shown as $R_1$ and $R_f$ vary in the same way with variations in the ambient temperature.

Figure 4:
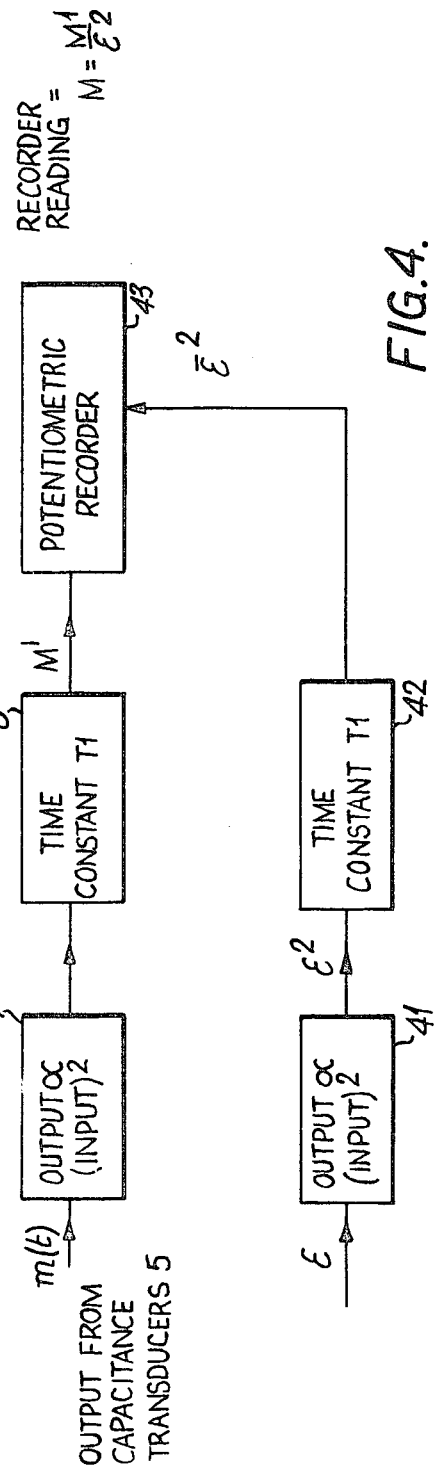
FIG. 4 shows an alternative arrangement for compensating for changes in the dielectric constant of powder flowing in the conveyor.

An alternative method of compensating for changes in the dielectric constant of the powder flowing in the conveyor 3 is shown in FIG. 4. In this arrangement the output signal from the capacitance transducer 5 is applied to the squaring circuit 7 and then to the smoothing circuit 8 as before, but the dielectric constant signal from the second transducer is applied to second squaring and smoothing circuits 41 and 42, respectively, that are similar to the circuits 7 and 8. The final output signals designated $M_1$ and $\epsilon^2$, respectively, are applied to a potentiometric recorder 43, the slide wire of which is arranged to be energized by the smoothed dielectric constant signal $\epsilon^2$.

The squaring and smoothing circuits 7 and 8 and 41 and 42, respectively, are of conventional form and therefore are not described in detail.

The operation of squaring the output signal from the transducer 5 causes the indication given by the instrument 9 or the recorder 43 to be linearly related to the mass flow rate, enabling the final calibration of the apparatus to be simplified. If this is regarded as unnecessary however, then the squaring circuit 7 can be replaced by a simple rectifier arrangement the squaring circuit 41 in this case being omitted from the embodiment of FIG. 4. Indeed, for some purposes, this may be desirable as the operating law will then be a square-root law resulting in a final calibration having a more open scale at the lower end of the range.

It is a postulate of the theory of the flowmeter that the capacitance noise frequency spectrum extends well above the maximum response frequency of the capacitance transducer. Under certain flow conditions, for example, large particles of low-air velocity, this may not be true. It may be necessary, therefore, to provide a reduction of the high-frequency response of the transducer. Additionally the reduction of the high-frequency response will make the apparatus insensitive to variations in the size of the particles of material being transported by the conveyor. This will result in a reduction of the bandwidth of the transducer, therefore it may also be necessary to provide for the time constant of the smoothing circuit 8 to be increased.

We claim:

1. A method for measuring the mass flow rate of particulate material conveyed hydrodynamically by means of a flowing fluid of substantially constant mean velocity comprising, the steps of producing an electrical noise signal responsive to the flow noise of the conveyed particulate material due to turbulence naturally occurring in the conveying fluid, and obtaining an indication dependent upon the power of the noise signal.

2. A method according to claim 1 wherein the nose signal is derived by sensing variations in the capacitance of an electrode exposed to the flowing fluid.

3. A method according to claim 2 including the operation of producing a compensating signal related to the dielectric constant of the particulate material and combining the compensating signal with the noise signal in such a manner as to render the noise signal insensitive to changes in the dielectric constant of the particulate material.

4. A method according to claim 1 wherein the particulate material is a powdered solid flowing in a pneumatic conveyor.

5. Apparatus for measuring the mass flow rate of particulate material conveyed hydrodynamically by means of a flowing fluid of substantially constant mean velocity comprising, sensing means adapted to be associated with a conveyor through which the fluid is to flow so as to be capable of sensing flow noise of the conveyed particulate material due to turbulence naturally occurring in the conveying fluid, means responsive to said sensing means for producing an electrical noise signal related to the flow noise, and means for giving an indication dependent upon the power of the noise signal.

6. Apparatus according to claim 5 wherein the sensing means is adapted to form part of a wall of the conveyor.

7. Apparatus according to claim 5 wherein the sensing means comprises an electrode adapted to be disposed so that variations in the quantity of particulate material flowing past the electrode cause corresponding changes in the capacitance thereof.

8. Apparatus according to claim 7 wherein the means for producing the noise signal related to the flow noise comprises a transducer adapted to produce an electrical signal related to changes in the capacitance of the electrode.

9. Apparatus according to claim 7 including means for compensating the noise signal for changes in the dielectric constant of the particulate material.

* * * * *